United States Patent
McLeod et al.

(10) Patent No.: US 6,793,261 B2
(45) Date of Patent: Sep. 21, 2004

(54) COMPOSITE SPARE WHEEL WELL

(75) Inventors: David G. McLeod, Rochester, MI (US); David M. Courter, Clarkston, MI (US); Xiaodong Tao, Troy, MI (US); Douglas P. McCollum, La Wantzenau (FR)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/310,169

(22) Filed: Dec. 4, 2002

(65) Prior Publication Data

US 2003/0102687 A1 Jun. 5, 2003

Related U.S. Application Data

(63) Continuation-in-part of application No. 10/006,823, filed on Dec. 4, 2001.

(51) Int. Cl.[7] .............................................. B62D 43/00
(52) U.S. Cl. .................................... 296/37.2; 224/42.12
(58) Field of Search ............................ 296/37.2, 37.14; 224/42.12, 42.2, 42.24, 42.25, 42.26

(56) References Cited

U.S. PATENT DOCUMENTS

| | | | | |
|---|---|---|---|---|
| 2,631,886 A | * | 3/1953 | Keller | 224/42.24 |
| 4,662,052 A | * | 5/1987 | Draper | 29/401.1 |
| 5,539,070 A | * | 7/1996 | Zharov et al. | 526/198 |
| 5,669,534 A | * | 9/1997 | Edgerley | 296/37.2 |
| 5,979,962 A | * | 11/1999 | Valentin et al. | 296/37.1 |
| 6,389,670 B2 | * | 5/2002 | Morin et al. | 296/37.2 |

* cited by examiner

*Primary Examiner*—Lori L. Coletta
(74) *Attorney, Agent, or Firm*—Warn Hoffmann Miller & LaLone PC

(57) ABSTRACT

A vehicle wheel well assembly is provided and is adapted to engage a vehicle floor pan. The wheel well assembly includes a floor and an annular sidewall extending upwardly from the periphery of the floor. A post extends upwardly from the center of the floor for engaging the spare wheel assembly. A threaded connector extends upwardly from the post for threaded engagement with a receptacle on a top. The sidewall terminates in either a mounting flange or a deck. When connected to a deck, the deck includes a mounting flange. The floor and sidewalls are integrally formed preferably of a composite material. A storage space is created in the area of the post. A method of securing a vehicle wheel well assembly in a vehicle is also provided.

49 Claims, 4 Drawing Sheets

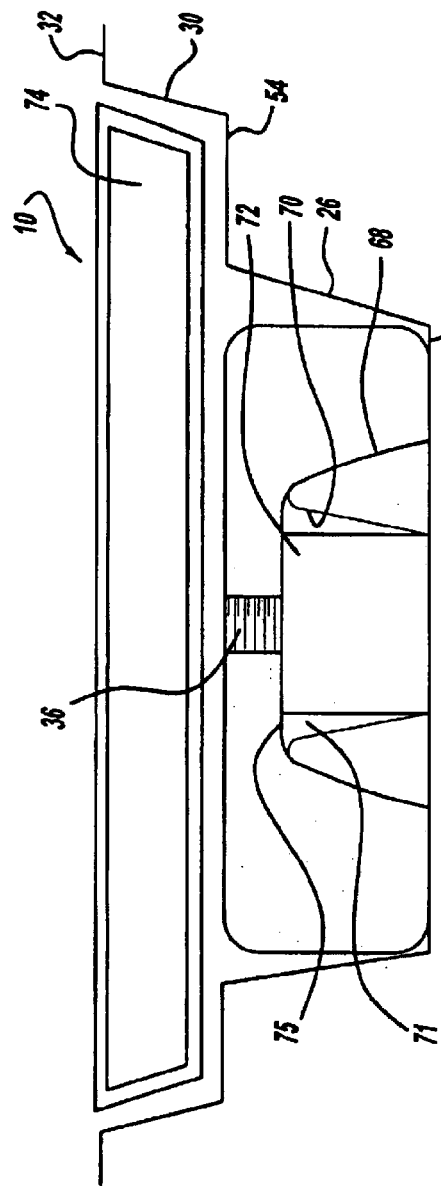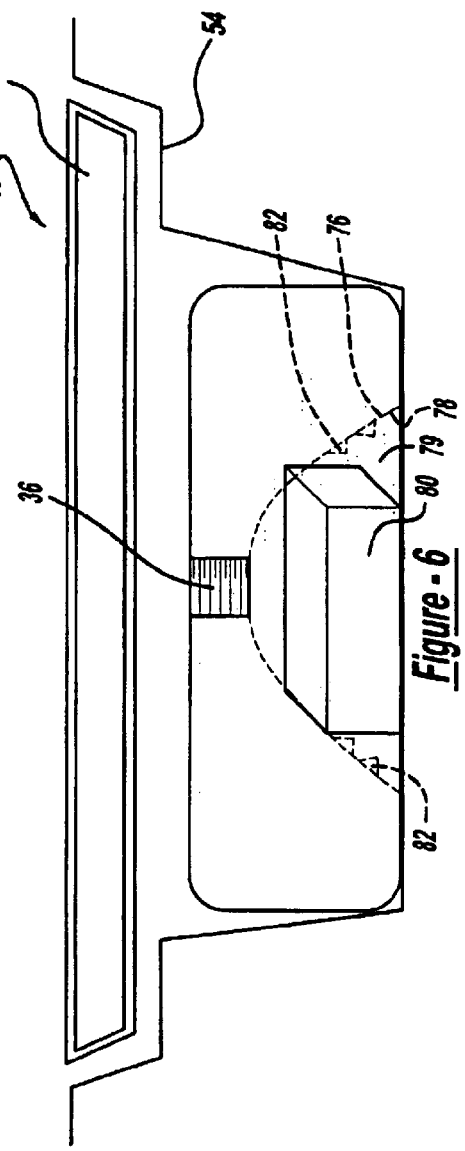

US 6,793,261 B2

COMPOSITE SPARE WHEEL WELL

This is a continuation-in-part and claims benefit of U.S. application Ser. No. 10/006,823 filed Dec. 4, 2001.

BACKGROUND OF THE INVENTION

1. Field of the Invention

The present invention relates to a composite spare wheel well for use in a vehicle.

2. Description of the Related Art

Presently, spare wheel wells are typically placed in the vehicle and secured to the vehicle floor pan. Current spare wheel wells are made of metal and are required to be stamped with several pieces of metal and welded together. The current wheel well is then affixed to the floor pan such as by welding, or the use of mechanical fasteners. The current spare wheel well assemblies are susceptible to corrosion, are noisy, and are relatively difficult to assemble and install in a vehicle.

It would be desirable to provide a wheel well that overcomes many of the deficiencies of the current wheel wells.

A vehicle storage compartment is shown in U.S. Pat. No. 5,636,890 to Cooper. The disclosed storage compartment is a tub-shaped container including an outwardly extending flange disposed around the circumference of the open end. The tub-shaped container is adapted to be inserted into the opening in the floor of the vehicle such that a flange rests above the floor of the vehicle adjacent the opening. The tub-shaped container is plastic and may include fiberglass reinforcement. A lid for the container is also provided.

SUMMARY OF THE INVENTION

According to the present invention, there is provided a wheel well assembly for connection with a floor pan of a vehicle. The wheel well comprises a floor and at least one sidewall extending upwardly from the floor. The floor and sidewall define a wheel well therein. A post is disposed in the wheel well. The floor, sidewall and post are integrally formed.

A method of securing a vehicle wheel well assembly to a vehicle is also provided. The method comprises providing a vehicle having a floor pan defining an opening therein for receiving a wheel well assembly. An integral vehicle wheel well assembly including a floor, at least one sidewall extending upwardly from the floor and a post extending upwardly from the floor intermediate the sidewall, and a mounting flange is also provided. The integral wheel well assembly is inserted into the opening in the vehicle. The mounting flange is adhesively secured with the vehicle floor pan.

BRIEF DESCRIPTION OF THE DRAWINGS

Advantages of the present invention will be more fully appreciated from the detailed description when considered in connection with accompanying drawings of presently preferred embodiments which are given by way of illustration only and are not limiting wherein:

FIG. 5 is a schematic view of an alternate embodiment of the present invention;

FIG. 6 is a schematic view of an alternate embodiment of the present invention;

DETAILED DESCRIPTION OF THE PREFERRED EMBODIMENT

Figure 1:
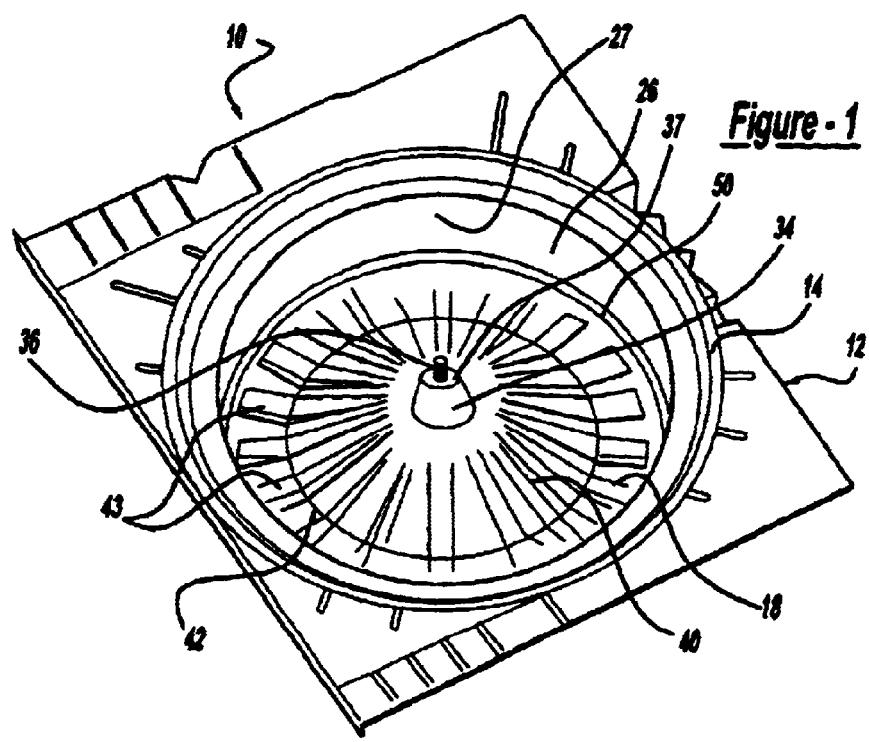
FIG. 1 is a perspective view of one presently preferred embodiment of the present invention.
Figure 4:
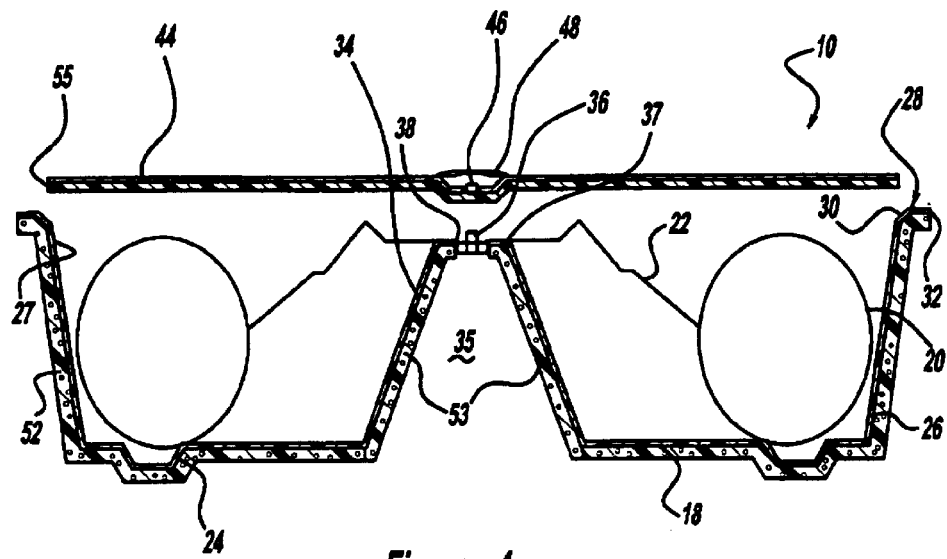
FIG. 4 is a cross-sectional view of a presently preferred embodiment of the present invention, schematically showing a wheel assembly.

A composite wheel well assembly is generally shown at 10 in FIGS. 1 and 4. The assembly 10 is for connection with a vehicle floor pan 12. The floor pan 12 defines and opening having a desired configuration. The periphery of the opening may include a first mounting surface 14 to which the composite wheel well assembly 10 may be secured. A second mounting surface 16 may also be provided. The second surface 16 may be angled with respect to the surface 14. The second surface 16 may provide a second mounting surface for the wheel well assembly 10. The second surface 16 also helps locate the composite wheel well assembly 10 in the opening of the vehicle floor pan 12. The mounting surface 14 is spaced preferably by a short distance from the uppermost surface of the floor pan 12. In this manner, the composite wheel well assembly 10 can be mounted on the surface 14 such that it is flush with the top surface of the floor pan 12.

The composite wheel well assembly 10 comprises a floor 18. The floor 18 preferably provides a surface for receiving a vehicle tire 20 and supporting the same within the wheel well assembly 10. Preferably, its floor 18 is flat. The vehicle tire 20 is attached to a wheel rim 22 as schematically represented in FIG. 4. As shown, the tire 20 is supported on the floor 18.

As best seen in FIG. 4, the floor 18 may include molded compartments or cavities 24. The compartments 24 may be molded into the floor 18. These molded-in compartments 24 may extend below the floor surface 18 upon which the vehicle tire 20 rests. The compartments 24 can be molded to accept and store a wide variety of items, such as a vehicle jack, lug wrench, safety equipment, or the like. It is preferable that the tire 20 still be supported by a flat section of the floor 18, even when a storage compartment 24 is present.

At least one sidewall 26 extends upwardly from the floor 18. As shown in FIGS. 1 and 4, the sidewall 26 comprises a single annular sidewall 26. It will be appreciated that multiple sidewalls 26 forming a variety of different shapes may be used. The sidewall 26 extends upwardly from the floor 18 and is flared slightly outwardly to facilitate installation and removal of a wheel from the wheel well assembly 10. The sidewall 26 and floor 18 define a cavity or wheel well 27 therein.

The sidewall 26 includes a mounting flange generally indicated at 28 at its distal end. Preferably, the mounting flange extends around the entire periphery of the sidewall 26. The mounting flange 28 may include one or more mounting sections 30, 32 designed to mate with the mounting surfaces 14, 16 of the floor pan 12. In this manner, the mounting sections 30, 32 of mounting flange 28 overlie the mounting surfaces 14, 16 of the floor pan 12. The mounting sections 30, 32 of the mounting flange 28 can be secured with the mounting surfaces 14, 16 of the floor pan 12 with the use of suitable adhesives. Alternatively, or in addition to adhesives, mechanical fasteners can be used to secure the mounting sections 30, 32 of the mounting flange 28 with the mounting surfaces 14, 16 of the vehicle floor pan 12. Currently preferred adhesives include polyurethane adhesives and LES (Low Energy Surface) adhesives. LES (Low Energy Surface Adhesive) refers to alkyl borane amine complex initiated acrylic adhesives. Representative of preferred LES adhesives are described in various patents including U.S. Pat. Nos. 5,106,928, 5,143,884, 5,286,821, 5,310,835, 5,376,746, 5,539,070; 5,690,780; and 5,691,065. These are also described in PCT application No. WO 2001144311 and the corresponding U.S. Ser. No. 09/466, 321 filed Dec. 17 1999. It will be appreciated, however, that any suitable adhesive may be used.

In the preferred embodiment, a post 34 extends upwardly from the floor 18. The post 34 is preferably frustoconical. It will be appreciated, however, that the post may take any geometric configuration and may be of any size. The post 34 extends upwardly from the floor 18 intermediate to sidewall 26. Preferably, the post 34 extends upwardly from the center of the floor 18. In this manner, the post 34 serves to center the spare wheel in the wheel well 27. The post 34 includes a connector, such as a bolt or stud 36 extending outwardly at the top end thereof. The bolt or stud 36 is preferably threaded into an opening 38 provided in the top surface 37 of the post 34.

As best shown in FIG. 1, in one embodiment, the floor 18 may include a segment 40 extending upwardly from the floor 18 to the post 34. The segment 40 is frustoconical and accommodates the rim assembly 22 of the spare tire assembly. The post 34 preferably extends upwardly from the center of floor segment 40. The area under any frustoconical floor segment 40 and the post 34 creates a storage space 35, best seen in FIG. 4. The storage space 35 can receive any variety of items to be stored. As shown, the storage space 35 can be accessed from underneath the assembly 10. Alternatively, the storage space 35 may be accessed from above the assembly 10. In such a case, a suitable access panel (not shown) may be included in either the floor 18 or post 34. The storage space 35 can take any suitable shape. The assembly 10 may also include a suitable closure (not shown) for covering the storage space 35.

The floor 18 preferably includes a plurality of stiffening members seen generally at 42 thereon. The stiffening members 43 preferably comprise ribs 43. Alternatively, the stiffening members may comprise gussets, convolutions, or any other suitable strengthening element that provides surface stiffening. The stiffening members 42 may also aid in centering the spare wheel in the spare wheel well. In certain instances, the stiffening members may project upwardly to aid in center the spare wheel. Further, it will be appreciated that the stiffening member 42 may take any geometric configuration. Further, there is no need for the geometry of the stiffening members 42 to be symmetrical. The ribs 43 provide stiffness to the assembly and further allow for contact between the ribs 43 and the rubber only portions of the tire 20. This aids in noise abatement within the wheel well 27. The ribs 43 preferably extend on the floor 18 and any additional flooring segments 40. Further, the stiffening members 42 provide structure to the assembly 10 which can be optimized to improve the rear crush zone and fuel tank impact characteristics. While not shown in the drawings, the sidewalls 26 and post may also include ribs thereon.

The post 34 is adapted to engage the central hub portion of the rim assembly 22 of the spare wheel. The post 34 centers the rim assembly 22 and tire 20 and prevents the spare wheel assembly from shifting within the wheel well 27.

The wheel well assembly 10 may further include a top 44 for covering the wheel well 17. The top 44 preferably includes a threaded fastener, such as a nut 46 for receiving the bolt 36. The top 44 can thus be threadedly secured to the bolt 36 in the post 34 for retaining the top 44 on the assembly 10. A handle 48 is also provided to allow the top 44 to be secured onto the bolt 36. Alternatively, hand holds, not shown, may be formed into the top 44, such as by molding, to permit a grasp location for the user to secure the top 44 with the bolt 36. In yet another alternate embodiment, the top may have only an opening for allowing the bolt 36 to pass through. A nut, such as a large wing nut, is then fastened on the bolt 36 to secure the top 44. As shown in FIG. 4 when the top 44 is installed, the top 44 is supported on the post 34. Thus, the post 34 aids in holding the top 44. Alternatively, the top 44 can be spaced from the post 34 and supported by the tire within the wheel well.

The floor 18 may further include a ledge portion 50. This ledge portion 50, provides a location for providing electrical equipment integration, such as, for example, to locate an antenna for a GPS, compass, phone or radio. The ledge portion 50, including the electrical component integration, could be integrally formed with the floor 18. Alternatively, the ledge portion 50 can be separately formed and the secured to the floor 18 or sidewall 26, such as by a snap fit or the use of suitable adhesives.

Preferably, the floor 18, sidewall 26, post 34, and any additional floor segments 40 are formed of a composite material. In the preferred embodiment, the composite materials used include but are not limited to glass-filled, mineral filled, or insert molded glass mesh, metallic mesh, polymer mesh, or mineral-glass filled combinations of semi-crystalline or amorphous polymers and include but are not limited to, polyamides such as nylon6, nylon6/6, nylon6/6/6/, polyolefins such as polyethylene or polypropylene, syndiotactic vinyl aromatic polymers such as syndiotactic polystyrene (SPS) and any blends thereof. Other potential polymers include polyesters, polyesteramides, polyarylates, polyurethane, polyureas, polyphenylene sulfides, and polyetherimides. It will be appreciated that other thermoplastic or thermoset composite materials may be used within the scope of the present invention. Each of the floor 18, compartments 24, sidewall 26, mounting flange 28, post 34, and any additional floor segments 40, are integrally formed such as by injection molding. The compartments may also be formed by blow-molding. It will be appreciated, however, that any technique may be used to integrally form the components. The compartments may also be formed from steel, aluminum, or laminates of the two in conjunction with polymeric materials.

As discussed above, the floor 18 may include integrally molded compartments 24. These compartments 24 are shown to be below the bottom surface of the floor 18. It will be appreciated, however, that the molded compartments 24 may be located alternatively, or additionally, on any additional flooring segments 40, or on the sidewall 26.

In order to install the wheel well assembly 10 in a vehicle, the vehicle and the floor pan 12 with an opening therein is provided. The floor pan 12 preferably includes mounting surfaces 14, 16 for receiving the wheel well assembly 10. The wheel well assembly 10 is inserted through the top of the opening in the floor pan 12 until the mounting flange 28 engages the mounting surfaces 14, 16 of the floor pan.

Adhesives may be applied to either or both of the underside of the mounting flange 28 and mounting surfaces 14, 16 prior to installation of the assembly 10. Once the adhesive has cured, the wheel well 27 is retained in the floor pan 12.

Alternatively, or additionally, mechanical fasteners are applied to the mounting flange 28 and floor pan mounting surfaces 14, 16 to secure the wheel well assembly 10 to the floor pan 12. The assembly 10 can be inserted with the tire 20 and rim 22 already placed in the wheel well 27. Alternatively, the tire 20 and rim 22 may be inserted after the assembly has been secured to the floor pan 12. Similarly, the top 44 may be pre-installed with the remainder of the wheel well assembly 10 or may be secured to the bolt 36 after the remainder of the assembly 10 has been secured to the floor pan 12.

It will also be appreciated that elements, such as seals, etc (not shown) may be interposed between the mounting flange 28 and the floor pan mounting surfaces 14, 16. In such a case, the adhesive may also be used to secure the seal in place.

The assembly 10 may also include a sound abatement layer. More specifically, FIG. 4 also shows a sound abatement layer 52 secured to the sidewall 26, floor 18 and a sound abatement layer 53 secured to the post 34 of the wheel well assembly 10. It is preferred that the sound abatement layer not contact the mounting flange 28. Similarly, a sound abatement layer 55 may be secured to one or both sides of the top 44. The sound abatement materials may be molded in placed or foamed in place. Preferably, the noise abatement materials include any adequate foam, filled foam, filled elastomeric sheet, or injection moldable filled material.

It will also be appreciated that a carpet material, not shown, may be placed on the top surface of the top 44. The carpet is used to match the carpet in the cargo hold area of the vehicle below which the wheel well assembly 10 is typically located. Each of the sound abatement layers 52, 53, 55, and carpet layer provide additional noise abatement properties to the wheel well assembly 10.

Figure 2:
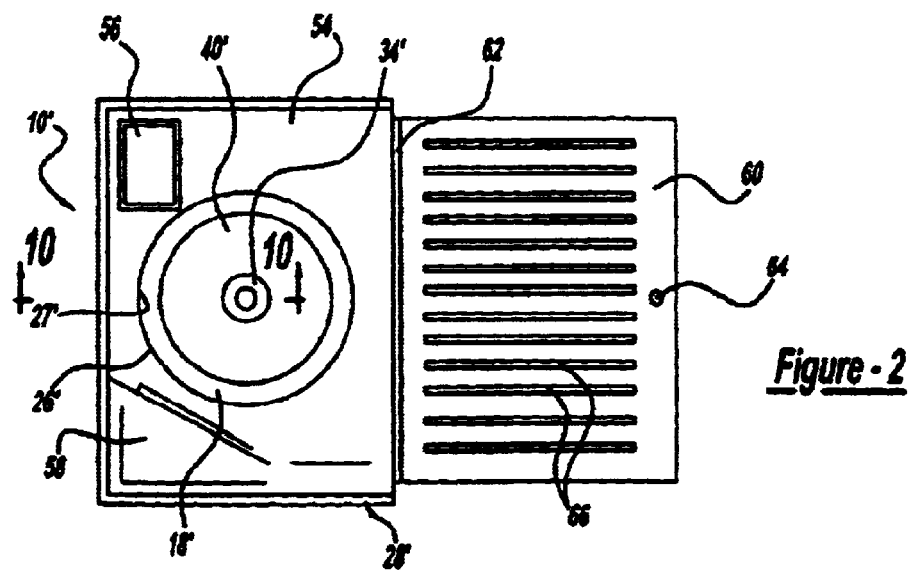
FIG. 2 is a top plan view of a second presently preferred embodiment of the present invention.
Figure 3:
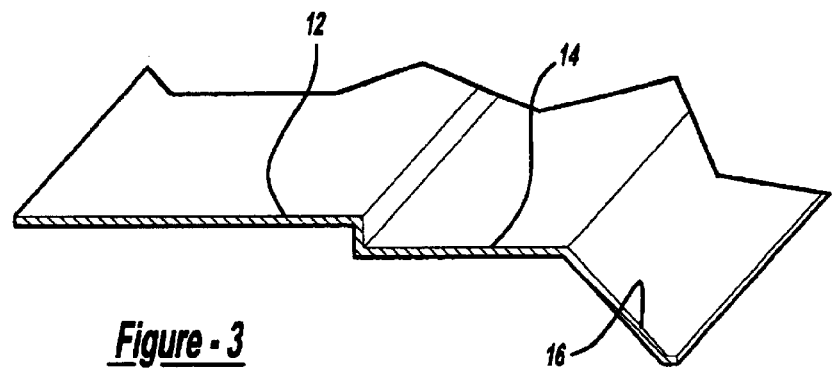
FIG. 3 is a cross-sectional view of one floor pan to which the present invention may be mounted.
Figure 10:
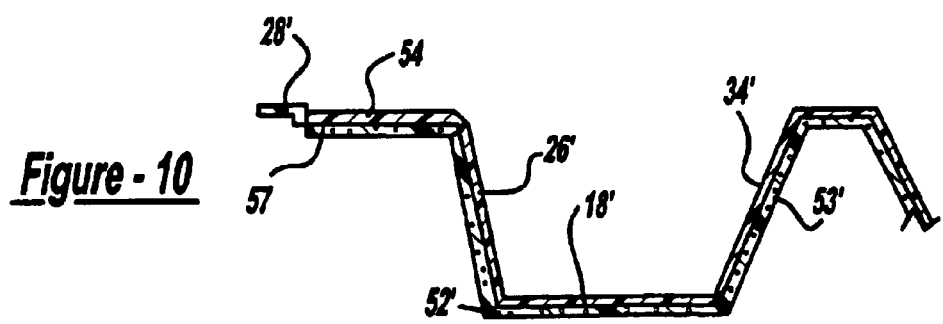
FIG. 10 is a cross-sectional view of one embodiment of the present invention taken along lines 10—10 of FIG 2.

FIG. 2 shows an alternate wheel well assembly. Like numerals will be used to represent the like components, however, a prime designation will be added to the numbers to distinguish the various embodiments. The wheel well assembly 10' is adapted for engaging a rectangular opening in a floor pan of the vehicle. The assembly includes a mounting flange 28'. The mounting flange 28' is connected to deck section 54. The deck section 54 is connected to the top of an annular sidewall 26'. A wheel well 27' is formed by an annular sidewall 26' extending below, the surface of the deck section 54. The sidewall 26' terminates in a floor 18'. A floor segment 40' is generally frustoconical and extends inwardly and upwardly from the floor 18'. A frustoconical post 34' is also provided. The post 34' extends upwardly preferably from the center of the floor segment 40', as described above. The post 34' may include a connection for receiving a member to secure the spare wheel assembly in the wheel well 27'. As shown in FIG. 10, the assembly 10' also includes a sound abatement layer 57 secured to the deck section 54.

Generally, the annular sidewall 26', floor 18', floor segment 40', and post 34' define the wheel well 27'. The wheel well 27' is the same as that set forth above. Though not shown in FIG. 2, the floor 18' and floor segment 40' may include a plurality of stiffening members such as ribs.

Additionally, the wheel well assembly 10', shown in FIG. 2, includes an area for molding in additional compartments. For example, a compartment 56 can be molded into the deck 54. That is, the compartment 56 can be molded to extend below the deck 54 top surface. The compartment 56 may be used to store any of a variety of tools and safety items. Further, the compartment 56 may be large enough to hold electronic equipment such as CD players. It will be appreciated that any number of such compartments may be provided for various purposes. Similarly, a tool receptacle 58, such as a molded in jack holder may also be provided. The tool receptacle 58 can be molded in the shape of the tool to be received. Alternatively, the tool receptacle 58 may just comprise clips extending upwardly to receive the tool and secure it such as by a snap fit. Each of these additional components 56 and tool receptacles 58 are preferably integrally formed with the wheel assembly 10'. Further, the compartments 56 or tool receptacles 58 can take any configuration and can be used to store any items.

A deck lid 60 is also provided. The deck lid 60 is integrally formed with the remainder of the wheel well assembly 10'. It is preferred that the latch 64 be molded into the deck lid 60 for securing the deck lid to the deck 54. Preferably, a mechanical fastening is provided. That is, the latch 64 may include a latch member having a post and a transverse leg at the distal end of the post. The deck 54 may include a contoured opening for allowing the leg to pass therethrough. Upon rotation of the latch, the leg will also rotate and engage the underside of the deck 54 to prevent opening of the lid 60. To open the lid 60, the latch is rotated until the leg aligns with the opening allowing it to pass therethrough. Any alternate latch may be used that retains the lid 60 on the deck. A plurality of strengthening ribs 66 are preferably molded into the deck lid 60. A living hinge 62 integrally connects the sidewall 26' with the deck lid 60. The deck lid 60 is for covering the wheel well 27 and deck 54. The lid 60 also provides a load floor for the vehicle.

A latch mechanism 64 is included to secure the deck lid 60 with the remainder of the wheel well assembly 10'.

As above, a sound abatement material may be molded to the bottom of the assembly 10' and on the inside on the deck lid 60. Further, carpeting may be placed on opposite side of the deck lid 60.

Further, preferably the assembly 10' is integrally molded. The materials may be the same as that used above. Due to the difficulty in molding a living hinge containing a filler material, a filler material, such as glass fibers may or may not be used in connection with this embodiment.

Installation of the wheel well assembly 10' is the same as that set forth above except, because the lid 60 is integral with the assembly 10', it will be installed at the same time as the remainder of the wheel well assembly.

FIGS. 5–10 show alternate embodiments of the present invention. Wherever possible, like reference numerals are used to represent like components throughout the various embodiments. A prime designation may be used to represent similar components.

FIGS. 5 and 6 schematically depict a wheel well assembly 10 having alternate post designs. In FIG. 5, the post 68 extends upwardly from the floor 18. The post 68 includes an internal opening 70. The internal opening 70 creates a storage space that can receive items 72 for storage. A deck 54 extends from the sidewall 26. The sidewall 26 and deck 54 are covered by a top 74. In this embodiment, the top 74 comprises a tray that can also be used to store items, such as the vehicle jack.

FIG. 6 shows, in phantom, yet another alternate post design 76. The post design includes an opening 78 underneath the post 76. The opening 78 is for creating a storage space 79 for receiving items 80 for storage. A deck 54 extends from the sidewall 26. The sidewall 26 and deck 54 are covered by a top 74. The top 74 comprises a tray that may receive items to be stored.

Figure 7:
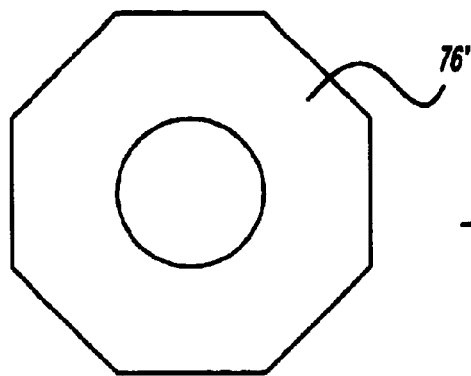
FIG. 7 is a top plan view of an alternate post design of the present invention.
Figure 8:
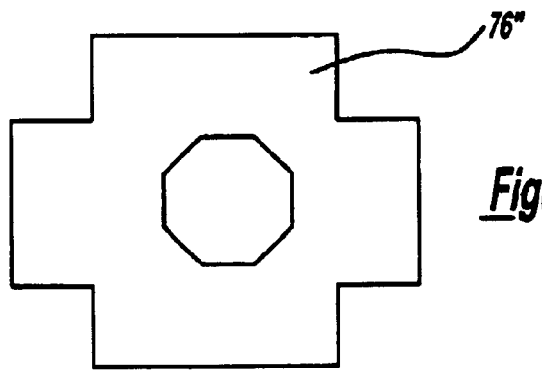
FIG. 8 is a top plan view of an alternate post design of the present invention.
Figure 9:
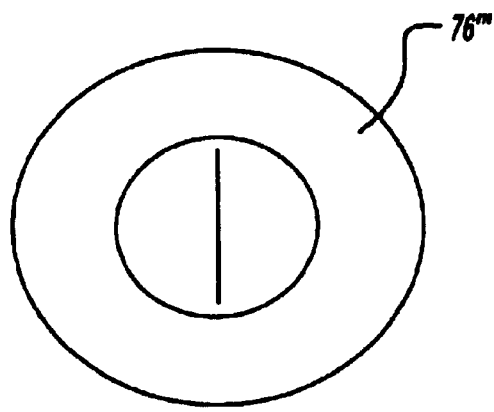
FIG. 9 is a top plan view of an alternate part design of the present invention.

It will be appreciated that the posts 34, 34', 68, 76 may take any configuration. FIGS. 7–9 show various plan views for some alternate post configurations 76', 76", and 76''', respectively. The post configurations can be selected to optimize any opening for receiving any of a variety of items.

In the presently preferred embodiments of the present invention, a storage space is thus created in the area of the post, regardless of its configuration. In some embodiments, the storage space 35, 79 is located below the post 34, 76 or floor 18, specifically, the floor segment 40. In this case, the storage space 35, 79 is preferably accessed from below the assembly 10. Further, a suitable closure (not shown) may be used to cover the storage space 35, 79. It will be appreciated that these storage spaces 35, 78 may also be accessed from above the assembly 10. In such a case, a suitable access panel (not shown) may be included.

FIG. 5 shows an alternate embodiment wherein the storage space 71 is created internally of the post 68. In this embodiment, the post 68 creates an Internal opening 70 formed by a depression in the post 68. This internal opening 70 is accessed from the top of the assembly 10. When such an assembly is used, a suitable closure 75 may be used to cover the opening 70. This closure 75 may also be used to carry fasteners, such as a bolt 36.

Thus, in each of the embodiments described, a storage space is created interiorly of the post. The storage space may either be accessed from above or below the assembly 10.

As stated above, the storage space can take any configuration for storing any kind of item. The items stored in the storage space may remain in the storage space for continuous use, such as the storage of a battery or a vapor canister for an EVAP assembly. When such items are stored, it may be desirable to include vents 82 in the post or floor. The vents 82 allow airflow through the storage space.

Additionally, the storage space may be used to temporarily store items. For example, as automobiles are made, they typically include different buyer chosen options. Items for these options, such as floor mats, antenna, battery cables, cargo nets, smoker's packages, owner's manuals, etc. These items can be placed in the storage area, and removed when necessary during the manufacturing process.

The wheel well assembly 10 is shown in an orientation to be secured in the floor pan of a vehicle. It will be appreciated that while not shown, the assembly 10 can be inverted for use in installations where the spare tire is normally stored under the vehicle, such as, for example, some trucks, vans and sport utility vehicles. In these instances, the mounting flange 28 is modified to engage suitable support structures under the vehicle and are secured thereto as set forth above. In such a case, the item to be stored in the storage space may comprise a tire lift carrier or the like. An opening in the post may allow for the passage of suitable cables.

Presently, the preferred embodiments of the invention have been described in an illustrative manner. It is to be understood that the terminology used is intended to be in the nature of words of description. Obviously many modifications and variations are possible in light of the above teachings.

It is to be understood that, within the scope of the appended claims, the invention may be practiced other than as specifically described.

What is claimed is:

1. A vehicle wheel well assembly adapted for connection with a floor pan of a vehicle comprising:
   a floor;
   at least one sidewall extending upwardly from said floor, and wherein said floor and said sidewall define a wheel well therein;
   a post disposed in said wheel well wherein said floor, said sidewall and said post are integrally formed; and
   said post defines a storage space located in the area within said post.

2. A vehicle wheel well assembly as set forth in claim 1 wherein said post extends upwardly from said floor intermediate said sidewall.

3. A vehicle wheel well assembly as set forth in claim 2 wherein said sidewall is annular.

4. A vehicle wheel well assembly as set forth in claim 1 wherein at least one of said floor, said sidewall and said post includes a stiffening member.

5. A vehicle wheel well assembly as set forth in claim 4 wherein said stiffening member comprises a rib.

6. A vehicle wheel well assembly as set forth in claim 1 wherein said floor comprises a flat segment and a frusto-conical segment.

7. A vehicle wheel well assembly as set forth in claim 1 wherein said floor and said post define a storage space.

8. A vehicle wheel well assembly as set forth in claim 1 wherein said sidewalls, said floor, and said post include a sound abatement layer.

9. A vehicle wheel well assembly as set forth in claim 1 wherein said sidewall, floor and said post are integrally formed of a composite material.

10. A vehicle wheel well assembly as set forth in claim 1 wherein said post includes a connector extending outwardly therefrom.

11. A vehicle wheel well assembly as set forth in claim 10 wherein said connector is a threaded connector that threadedly engages an opening defined in said post.

12. A vehicle wheel well assembly as set forth in claim 10 wherein at least one of said sidewalls and said floor define a cavity.

13. A vehicle wheel well assembly as set forth in claim 1 wherein one of said floor and said sidewall includes a ledge for the integration of electrical equipment.

14. A vehicle wheel well assembly as set forth in claim 1 wherein said sidewalls include a mounting flange adapted for engaging the vehicle floor pan.

15. A vehicle wheel well assembly as set forth in claim 4 wherein said vehicle wheel well assembly includes a top.

16. A vehicle wheel well assembly as set forth in claim 15 wherein said top includes a fastener for mounting said top with a connector.

17. A vehicle wheel well assembly as set forth in claim 15 wherein said top includes a sound abatement layer.

18. A vehicle wheel well assembly as set forth in claim 1 wherein said sidewall is connected to a deck.

19. A vehicle wheel well assembly as set forth in claim 18 wherein said floor, said sidewall, said post, and said deck are integrally formed.

20. A vehicle wheel well assembly as set forth in claim 18 wherein said deck includes a mounting flange adapted for engaging the vehicle floor plan.

21. A vehicle wheel well assembly as set forth in claim 18 including a lid integrally connected with said deck.

22. A vehicle wheel well assembly as set forth in claim 21 wherein said connection between said deck and said lid comprises a living hinge.

23. A vehicle wheel well assembly as set forth in claim 18 wherein said deck includes at least one receptacle.

24. A vehicle wheel well assembly as set forth in claim 23 wherein said deck includes at least one compartment.

25. A vehicle wheel well assembly as set forth in claim 21 wherein said lid includes stiffening members.

26. A vehicle wheel well assembly as set forth in claim 21 wherein said lid includes a latch adapted to secure said lid with said deck.

27. A vehicle wheel well assembly as set forth in claim 18 wherein said floor, said sidewall, and said deck include a sound abatement layer.

28. A method of securing a vehicle wheel well assembly to a vehicle comprising:
   providing the vehicle having a floor pan defining an opening therein for receiving the vehicle wheel well assembly;
   providing an integral vehicle wheel well assembly including a floor, at least one sidewall extending upwardly from the floor and a post extending upwardly from the floor intermediate the sidewall, the post defining a storage space located in the area within the post, and a mounting flange;
   inserting the integral wheel well assembly into the opening in the vehicle; and
   adhesively securing the mounting flange with the vehicle floor pan.

29. A method as set forth in claim 28 further comprising integrally forming the floor, at least one side wall, post and mounting flange from a composite material.

30. A method as set forth in claim 29 further comprising adhesively securing the mounting flange with the floor pan using a low energy surface adhesive.

31. A method as set forth in claim 29 further comprising adhesively securing the mounting flange with the floor pan using a polyurethane adhesive.

32. A vehicle wheel well assembly adapted for connection with a floor pan of a vehicle comprising:
   a floor;
   at least one sidewall extending upwardly from said floor, and wherein said floor and said sidewall define a wheel well therein; and
   a post disposed in said wheel well wherein said post defines a storage space; and
   said storage space is defined under said post.

33. A vehicle wheel well assembly as set forth in claim 32 wherein said post includes an internal opening defining said storage space.

34. A vehicle wheel well assembly as set forth in claim 32 wherein said post extends upwardly from said floor intermediate said sidewall.

35. A vehicle wheel well assembly as set forth in claim 34 wherein at least one of said floor, said sidewall and said post includes a stiffening member.

36. A vehicle wheel well assembly as set forth in claim 32 wherein said storage space is defined under said floor and said post.

37. A vehicle wheel well assembly as set forth in claim 32 wherein said sidewalls, said floor, and said post include a sound abatement layer.

38. A vehicle wheel well assembly as set forth in claim 32 wherein said sidewall, floor and said post are integrally formed.

39. A vehicle wheel well assembly as set forth in claim 32 wherein said post includes a connector extending outwardly therefrom.

40. A vehicle wheel well assembly as set forth in claim 32 wherein at least one of said sidewalls and said floor define a cavity.

41. A vehicle wheel well assembly as set forth in claim 32 wherein one of said floor and said sidewall includes a ledge for the integration of at least one of electrical and electric equipment.

42. A vehicle wheel well assembly as set forth in claim 32 wherein said sidewalls include a mounting flange adapted for engaging a vehicle floor pan.

43. A vehicle wheel well assembly as set forth in claim 32 wherein said vehicle wheel well assembly includes a top.

44. A vehicle wheel well assembly as set forth in claim 43 wherein said top includes a sound abatement layer.

45. A vehicle wheel well assembly as set forth in claim 32 wherein said sidewall is connected to a deck.

46. A vehicle wheel well assembly as set forth in claim 45 wherein said deck includes a mounting flange adapted for engaging the vehicle floor plan.

47. A vehicle wheel well assembly as set forth in claim 45 wherein said deck includes at least one receptacle.

48. A vehicle wheel well assembly as set forth in claim 45 wherein said deck includes at least one compartment.

49. A vehicle wheel well assembly as set forth in claim 45 wherein said floor, said sidewall, and said deck include a sound abatement layer.

* * * * *